United States Patent [19]

Devonald, III et al.

[11] Patent Number: 5,578,792
[45] Date of Patent: Nov. 26, 1996

[54] INTERCONNECTION ARRANGEMENT FOR ELECTRICAL EQUIPMENT ENCLOSURES

[76] Inventors: David H. Devonald, III, 2120 Cranbrook Rd., Green Oaks, Ill. 60048; Leonard V. Chabala, 1626 S. 14th St., Maywood, Ill. 60153; Albert F. Cowsky, 547 Bianco Dr., Elk Grove Village, Ill. 60007; Michael P. O'Dell, 312 S. Kenilworth, Oak Park, Ill. 60302

[21] Appl. No.: 308,162

[22] Filed: Sep. 15, 1994

Related U.S. Application Data

[63] Continuation of Ser. No. 760,630, Sep. 16, 1991, abandoned.

[51] Int. Cl.⁶ .............................. H05K 5/02; H02B 7/00; H02B 1/04
[52] U.S. Cl. .............................. 174/50; 174/38; 361/605
[58] Field of Search .............................. 174/38, 50, 37, 174/52.1, 59, 60, 65 R; 200/17 R, 148 B, 148 R; 361/38, 601, 602, 605, 622; 439/215

[56] References Cited

U.S. PATENT DOCUMENTS

| | | | |
|---|---|---|---|
| 3,787,711 | 1/1974 | Bright | 174/38 X |
| 3,841,031 | 10/1974 | Grannis, III | 174/38 X |
| 4,133,021 | 1/1979 | King et al. | 174/38 X |
| 4,644,095 | 2/1987 | Bright et al. | 174/50 |
| 5,025,171 | 6/1991 | Fanta et al. | 361/335 X |
| 5,062,022 | 10/1991 | Beard et al. | 361/335 |
| 5,136,463 | 4/1992 | Webster | 361/334 |
| 5,216,577 | 6/1993 | Schilling | 174/38 X |

OTHER PUBLICATIONS

S & C Switch Operators–Type PM For Field Retrofit in Manual PMH, PMS and PME Pad–Mounted Gear, S & C Electric Company, Chicago, Sep. 1991, 4 pages.

*Primary Examiner*—Peter Vo

[57] ABSTRACT

An interconnection arrangement is provided for the appropriate interconnection of predetermined assemblies and modules affixed to the exterior of an enclosure of pad-mounted gear, while also shielding the interconnections from the medium-voltage sections of the pad-mounted gear. The interconnection arrangement may be utilized either during manufacture of the pad-mounted gear or as a field retrofit installation. The interconnection arrangement includes a base assembly which defines predetermined enclosed cable pathways through which the interconnecting conductors are routed. The interconnecting conductors are provided by preassembled and pre-routed cable harnesses within the defined cable pathways. The interconnection arrangement also includes internal and external duct structures that extend the cable pathways through the base assembly and into the individual enclosures for the assemblies and modules affixed to the exterior of the enclosure of the pad-mounted gear. The interconnection arrangement is of modular design so as to be easily configurable for installation to different configurations of pad-mounted gear and affixed assemblies. In addition to the interconnection arrangement being versatile, it also lends itself to ease of manufacture and the use of basic component parts to provide different configurations as either manufacturing assemblies or field retrofit kits.

10 Claims, 3 Drawing Sheets

INTERCONNECTION ARRANGEMENT FOR ELECTRICAL EQUIPMENT ENCLOSURES

This is continuation of application Ser. No. 07/760,640 filed Sep. 16, 1991.

BACKGROUND OF THE INVENTION

1. Field of the Invention

The present invention relates generally to the field of electrical equipment enclosures and, more particularly, to an electrical interconnection arrangement to appropriately interconnect electrical conductors between assemblies and modules of pad-mounted gear such as switch operators and communication and control units, while also serving to shield the low-voltage control wiring from the medium voltage within the pad-mounted gear.

2. Description of the Related Art

Various types of pad-mounted gear are available that include appropriate combinations of switches and fuses that are housed within metal enclosures. These configurations are available as both manually operated and power-operated units. It is desirable to provide power-operated switch operators that are affixed externally to the enclosure of the pad-mounted gear either during manufacture of the pad-mounted gear or as a field retrofit. For example, reference may be made to U.S. Pat. Nos. 5,025,171, 5,034,584, and 4,804,809. Additionally, power operation of the switches may be accomplished in an automated distribution system in response to signals from a remote location via a communication and control unit utilizing a remote terminal unit.

While these arrangements may be generally suitable for their intended uses, the installation of the necessary interconnection wiring requires a great deal of labor and manipulation as to routing of the wiring, especially for field retrofit and for the more complex configurations of multiple switch operators. Further, the presence of this low-voltage supply and control wiring in the medium-voltage compartments of the pad-mounted gear is also not a desirable situation for a variety of reasons.

SUMMARY OF THE INVENTION

Accordingly, it is a principal object of the present invention to provide an interconnection arrangement for pad-mounted gear that can be easily installed either in field retrofit or factory assembly to provide the electrical interconnections between switch operators and communication and control units that are affixed externally to the enclosure of the pad-mounted gear, while providing shielding of the interconnected control wires from the medium-voltage sections of the pad-mounted gear.

It is another object of the present invention to provide method and apparatus for defining cable pathways for the efficient routing of various conductors to supply operating power to and to interconnect control paths between assemblies affixed to the exterior of an enclosure for pad-mounted gear, while also providing shielding and isolation of the low-voltage conductors from the medium-voltage sections of the pad-mounted gear.

It is a further object of the present invention to provide predetermined interconnection control paths and to route operating power between switch operators and other assemblies housed within individual enclosures that are affixed on the exterior of an enclosure of pad-mounted gear such that the desired interconnection can be efficiently accomplished either during manufacture or as a field retrofit to pad-mounted gear.

These and other objects of the present invention are efficiently achieved by an interconnection arrangement for the appropriate interconnection of predetermined assemblies and modules affixed to the exterior of an enclosure of pad-mounted gear, while also shielding the interconnections from the medium-voltage sections of the pad-mounted gear. The interconnection arrangement may be utilized either during manufacture of the pad-mounted gear or as a field retrofit installation.

The interconnection arrangement includes a base assembly which defines predetermined enclosed cable pathways through which the interconnecting conductors are routed. The interconnecting conductors are provided by preassembled and pre-routed cable harnesses within the defined cable pathways. The interconnection arrangement includes internal and external duct structures that extend the cable pathways through the base assembly and into the individual enclosures for the assemblies and modules affixed to the exterior of the enclosure of the pad-mounted gear.

The field retrofit installation procedure is accomplished by: de-energizing the pad-mounted gear; disconnecting the various cable terminations that connect the pad-mounted gear to the electric power distribution system; attaching the desired assemblies such as one or more switch operators and a communication and control unit to the pad-mounted gear; physically disconnecting the pad-mounted gear from the pad and lifting the pad-mounted gear off the pad; installing the preassembled base assembly of the interconnection arrangement to the pad; feeding the interconnection cable harnesses out of the base assembly; affixing various duct assemblies to the base assembly in the appropriate locations; lowering the pad-mounted gear onto the base assembly while also passing the cable harnesses into the openings in the bottom of the individual enclosures of the assemblies affixed to the pad-mounted gear; connecting the cable harnesses to the assemblies; securing the external duct structures to the assemblies and the internal duct structures to the base assembly; and re-mounting, re-connecting, and re-energizing the pad-mounted gear.

The interconnection arrangement is of modular design so as to be easily configurable for installation to different configurations of pad-mounted gear and affixed assemblies. In addition to the interconnection arrangement being versatile, it also lends itself to ease of manufacture and the use of basic component parts to provide different configurations as either manufacturing assemblies or field retrofit kits.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
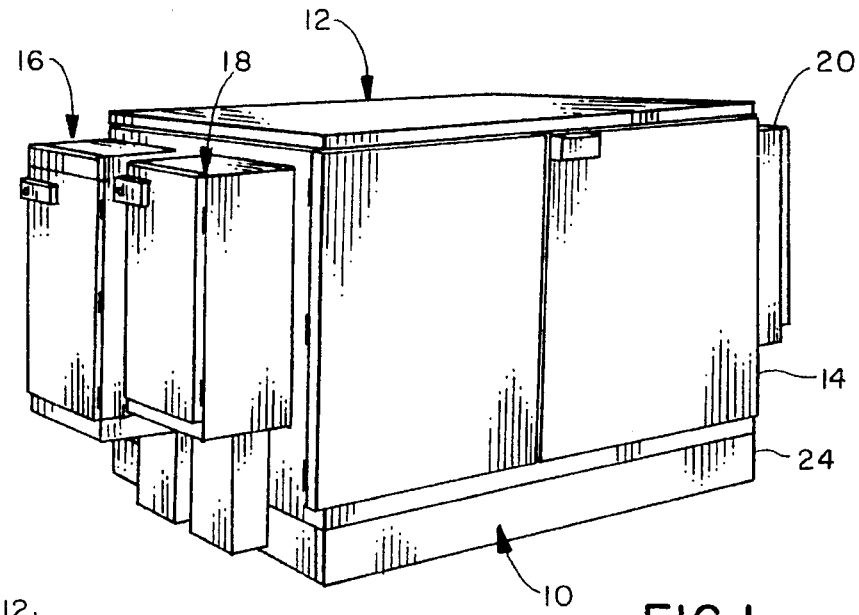
FIG. 1 is a perspective view of the interconnection arrangement of the present invention as installed with pad-mounted gear that includes modules and assemblies affixed to the exterior of an enclosure of the pad-mounted gear.
Figure 2:
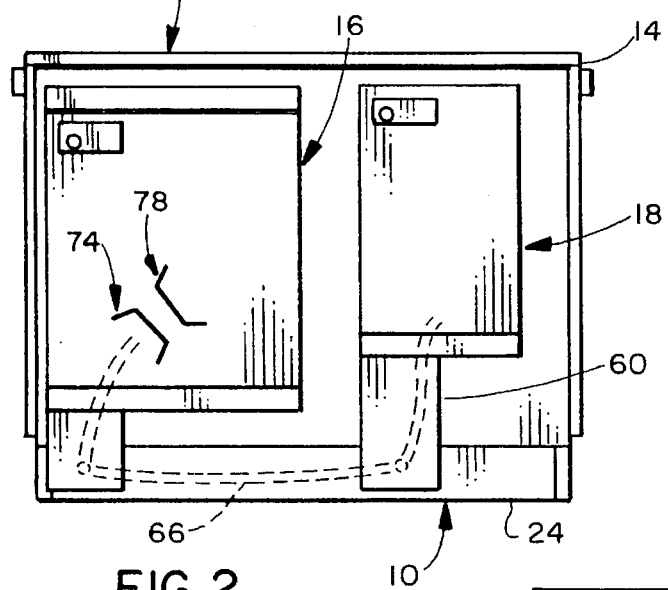
FIGS. 2 and 3 are left and right side elevational views, respectively, of the arrangement of FIG. 1.

Referring now to FIGS. 1–4, the interconnection arrangement of the present invention is generally referred to at 10 and is illustrated as installed with pad-mounted gear 12 including an enclosure 14. In the illustrative configurations of FIGS. 1–3, the enclosure 14 of the pad-mounted gear 12 has affixed thereto illustrative modules or assemblies 16,18, 20, and 22. In a specific example for purposes of illustrating the application and utility of the present invention, the modules or assemblies 18, 20 and 22 are switch operators for power operation of switches (not shown) within the enclosure 14. Further, the module or assembly 16 is an auxiliary enclosure that houses a communication and control unit (not shown) having, for example, a remote terminal unit (RTU) and a radio transceiver. In an illustrative arrangement to provide remote supervisory control, the pad-mounted gear 12, the interconnection arrangement 10, the switch operators 18,20 and 22, and the RTU in the module 16 provide a self-contained arrangement for an automated distribution system that is responsive to signals from a remote location, such as a master station computer, to operate the switches of the pad-mounted gear 12. Additionally, the arrangement permits monitoring of circuit conditions at the location.

The interconnection arrangement 10 defines enclosed cable pathways for the routing of the electrical conductors to accomplish the interconnection of the various modules or assemblies 16, 18, 20 and 22 so as to provide control paths between the switch operators and the communication and control unit and to route operating power between the switch operators and the communication and control unit. The defined cable pathways of the interconnection arrangement 10 not only provide efficient routing of the various conductors for the interconnection between the predetermined points, but also provide shielding of the low-voltage interconnection conductors from the medium voltage present within the pad-mounted gear 12.

In accordance with important aspects of the present invention, the interconnection arrangement 10 is capable of installation with the pad-mounted gear 12 either during manufacture of the pad-mounted gear 12 in a manufacturing environment, or as a field retrofit installation to existing installed pad-mounted gear. That is, if the pad-mounted gear 12 is either already, presently installed at a location or otherwise available in the field, the modules or assemblies 16, 18, 20 and 22 may be affixed to the enclosure 14 and the interconnection arrangement 10 may be assembled with the pad-mounted gear 12, the interconnection arrangement 10 being positioned below and supporting the pad-mounted gear 12. Interconnections are then made between the modules and assemblies by the connection of the routed conductors to the appropriate points of the modules and assemblies via preassembled and routed cable harnesses within the cable pathways, as will be explained in more detail hereinafter. Further, the interconnection arrangement 10, when assembled, has no externally accessible fasteners.

Of course, it should be understood that the field retrofit is performed with the pad-mounted gear 12 de-energized. Further, as to an installed pad-mounted gear 12, the cable terminations to the power system need to be disconnected and the pad-mounted gear 12 lifted off the pad to attach the interconnection arrangement 10.

Figure 3:
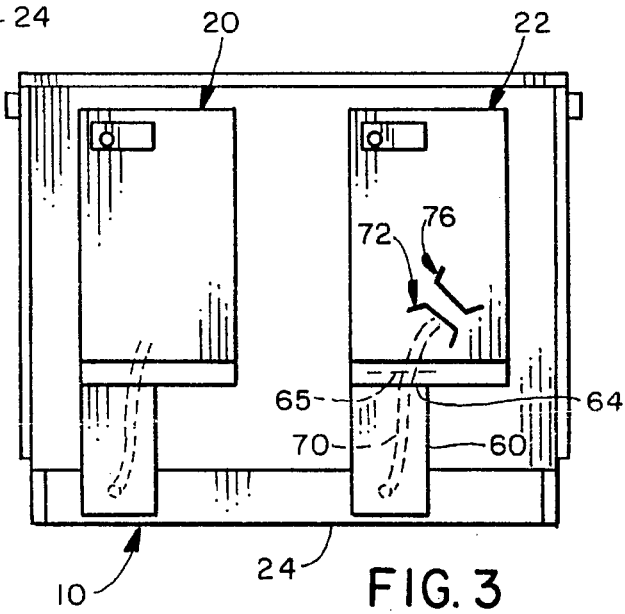
Figure 4:
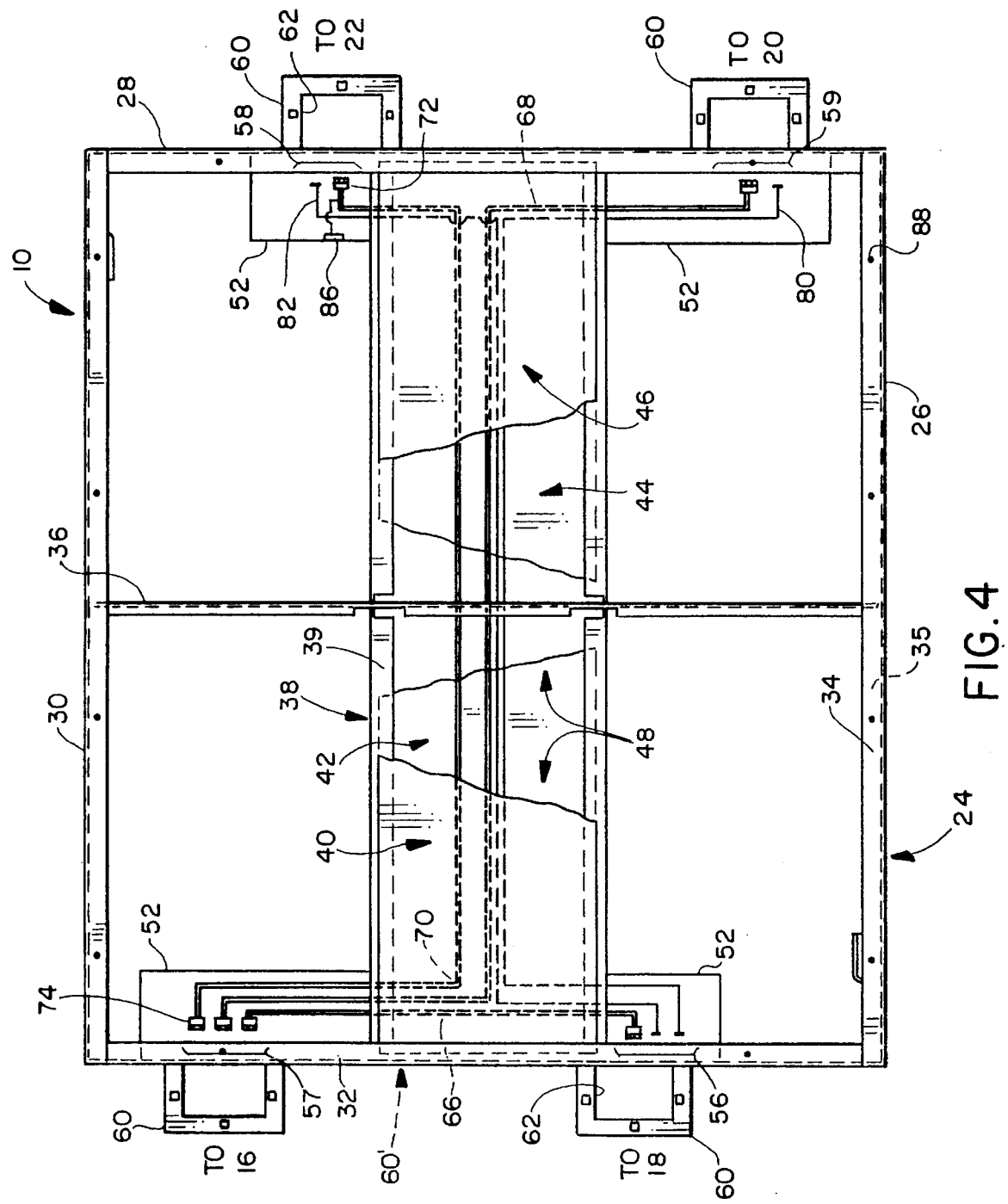
FIG. 4 is a top plan view of the interconnection arrangement of the present invention of FIGS. 1–3.
Figure 5:
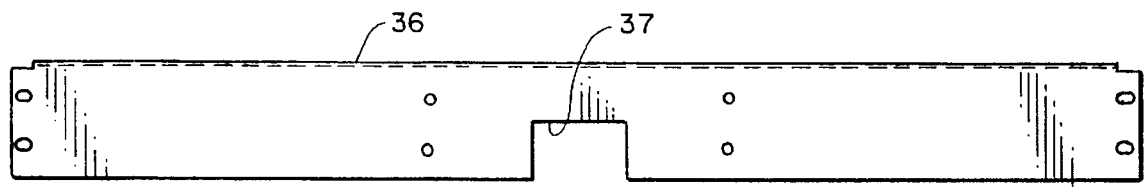
FIG. 5 is a front elevational view of a support member of the interconnection arrangement of FIG. 4.

Referring now additionally to FIGS. 2–6, the interconnection arrangement 10 includes a base member 24 defined by upstanding wall members and having a periphery essentially congruent to the pad-mounted gear 12. In the illustrative configuration, the enclosure 14 of the pad-mounted gear 12 includes a generally rectangular base and thus the interconnection arrangement 10 also includes a base 24 that is of similar dimensions as defined by upstanding wall members 26, 28, 30, and 32. The wall members 26,28,30 and 32 include turned edges or flanges 34,35 at the top and bottom, respectively, of each of the wall members. The wall members 26,28,30 and 32 are appropriately affixed to each other by the use of fasteners or the like. A structural support member 36, best seen in FIG. 5, is affixed to and spans the wall members 26,30 for providing additional rigidity and strength to the base 24.

Figure 6:
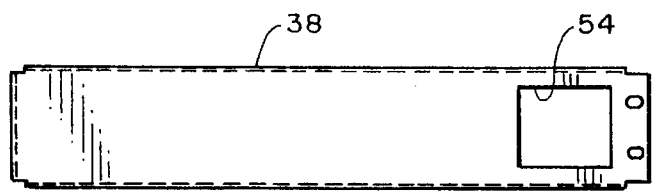
FIG. 6 is a front elevational view of a pathway defining member of the interconnection arrangement of FIG. 4.

Four structural members 38, best seen in FIG. 6, are affixed to the structural support member 36, span the wall members 28,32, and are of approximately the same height as the wall members and the structural support member 36. The structural members 38 each include upper and lower flanges 39,41 respectively. Additionally, covers 40 and 46 are affixed to the tops of the members 38 and covers 42,44 are affixed to the bottoms of the members 38 so as to define an enclosed cable pathway or duct 48 within the central section of the base 24 of the interconnection arrangement 10. The structural support member 36 includes an appropriate central opening 37 for the continuation of the cable pathway 48. The members 36 and 38 also divide the base 24 into compartments corresponding to the predetermined compartments of the enclosure 14 of the pad-mounted gear 12.

Figure 7:
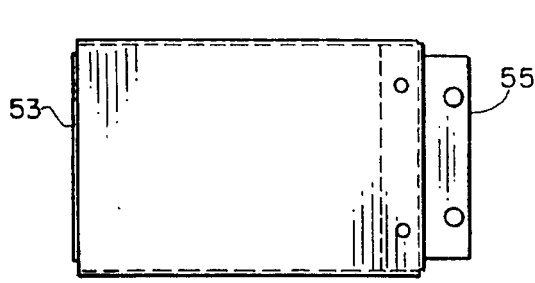
FIGS. 7–8 are respective front elevational and top plan views of an internal duct of the cable pathway defining apparatus of the interconnection arrangement of FIGS. 1–4.
Figure 8:
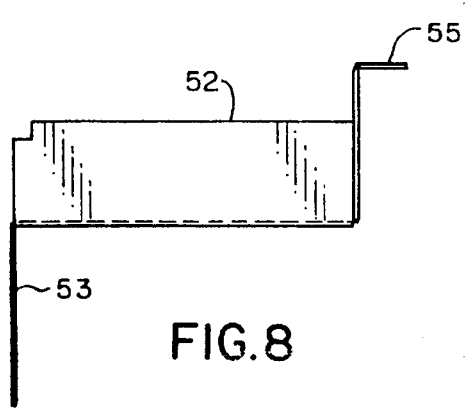

Internal duct members 52, best seen in FIGS. 7–8, are provided at the ends of the cable pathway 48 adjacent the walls members 28,32 and are each respectively affixed to one of the structural members 38 and one of the wall members 28,32 so as to span an opening 54 provided in the structural members 38 to continue the cable pathway 48 into the internal ducts 52. Specifically, a flange 53 of the internal duct 52 is affixed to the member 38 and a flange 55 is affixed to the wall 28 or 32. Cableway openings at 56,57,58 and 59 are provided through the wall members 28 and 32 at the appropriate locations of the modules and assemblies 16, 18,20, and 22.

Figure 9:
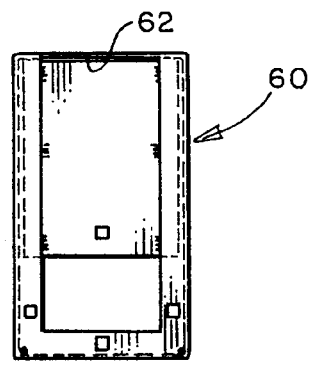
FIG. 9 is a rear elevational view of an external duct of the interconnection arrangement of FIGS. 1–4 that defines the cable pathway of the interconnection arrangement between a base of the interconnection arrangement and the modules and assemblies affixed to the enclosure of the pad-mounted gear.

Referring now to FIG. 9, external ducts 60 are affixed to the exterior of the wall members 28,32 of the base 24 over the cableway openings 56,57,58, and 59. The external ducts 60 are dimensioned to extend upward to the bottom of the respective modules and assemblies 16, 18,20, and 22. In this manner, the external ducts 60 provide an extension of the cable pathway 48 into and through appropriate openings in the bottom of the enclosures of the respective modules and assemblies 16,18,20 and 22 via the open top portions 62 of the external ducts 60. For example, an opening 64 is provided in the bottom of the module 22, as seen in FIG. 3.

In accordance with the features of the present invention, it should be noted that the cable pathway 48 extends between all the modules and assemblies 16,18,20, and 22 via the external ducts 60, the internal ducts 52, and the central enclosed portion of the base 24 defined by the members 38 and the covers 40,42,44, and 46. Thus, whatever interconnections are needed for particular configurations can be readily accomplished via the provision of predetermined, preassembled cable harnesses of conductors. For example, as shown in FIG. 4, the cable harnesses 66,68, and 70 are provided for the necessary interconnection of control paths between the communication and control unit 16 and the respective switch operators 18,20, and 22. Appropriate strain relief and protection for the cable harnesses 66,68, and 70 are provided at the cableway openings 56,57,58, and 59 via suitable strain-relief members, bushings, grommets, or the like. The cable harnesses 66,68, and 70 include appropriate connectors, e.g., connectors 72,74 for the cable harness 70, which are arranged to interfit with respective connectors or the like 76 in the switch operator 22 and 78 in the communication and control unit 16. Additionally, power control interconnections are provided via cable harnesses 80 and 82 between the respective switch operators 20 and 22 and the switch operator 18. In a specific configuration, the switch operators 20,22 receive operating power from the switch operator 18 such that the switch operators 20,22 are designated as companion operators.

Considering now in more detail the field retrofit installation of the interconnection arrangement 10, after the pad-mounted gear 12 has been de-energized and the cable terminations to the power conductors disconnected, the modules and assemblies 16,18,20, and 22 are attached to the enclosure 14 of the pad-mounted gear 12 and suitably connected to the switch-operating shafts. Of course, the modules and assemblies may optionally have already been attached to the pad-mounted gear 12 prior to the time of installation of the interconnection arrangement 10. Next, the pad-mounted gear 12 is physically and structurally disconnected from the pad or other mounting structure. At this point, the pad-mounted gear 12 is lifted off the pad so that the interconnection arrangement 10 may be attached to the mounting pad.

Prior to the attachment of the interconnection arrangement 10 to the pad-mounted gear 12, the interconnection arrangement 10 is prepared in the field. This entails applying appropriate gasketing to various parts, feeding and extending the cable harnesses 66,68,70,80 and 82 through the holes 56,57,58, and 59 in the base 24, affixing the external ducts 60 to the base 24, and also attaching the internal ducts 52. For example, the external ducts 60 are affixed to the base 24 via bolts 61 (FIG. 4) that are inserted from the inside of the base and threaded into clip nuts 63 (FIG. 9) carried by the external ducts 60.

At this point in the installation, bottom access plates of the modules and assemblies 16,18,20, and 22, such as an access plate 67 (FIG. 3) overlying the opening 64 of module 22, are removed and the pad-mounted gear 12 lowered onto the base 24 which has been positioned on the pad. The base 24 is attached to the enclosure 14 of the pad-mounted gear 12 via suitable fasteners or the like that are assembled through holes 88 in the base 24 and the enclosure 14. As the enclosure 14 is lowered onto the base 24, the various cable harnesses are passed through the openings 64 of the modules and assemblies 16,18,20, and 22. The ground bus connector 84 of the base 24 is connected to the respective ground bus connector of the enclosure 14. The connectors of the cable harnesses are then connected into the mating connectors of the modules and assemblies.

After these steps, the external ducts 60 are affixed to the modules and assemblies and the external ducts 60 are also now firmly affixed to the base 24; e.g., the external ducts 60 are affixed to the modules via bolts 90 (FIG. 9) that are inserted from the inside of the module 20 and threaded into clip nuts 92 (FIGS. 4 and 9) carried by the external ducts 60. Next, the internal ducts 52 are positioned for final affixing and then tightened into place, the internal ducts 52 having been loosely attached previously but oriented so as to provide access to the interior for any necessary cable harness manipulation. Finally, the pad-mounted gear 12 with attached interconnection arrangement 10 is physically secured to the pad. The desired current and/or voltage sensors are installed, and suitable interconnections accomplished. For example, the cable harnesses 66,68, and 70 are provided with appropriate cable conductors and connectors, for example, connector 86 on cable harness 70 for interconnection to a mating connector of the various installed sensors. It should be noted that there are no externally accessible fasteners.

Figure 10:
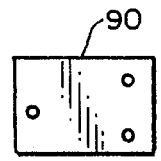
FIG. 10 is a front elevational view of a cover plate utilized to close off certain portions of the cable pathways of the interconnection arrangement of FIGS. 1–4.

Regarding the different configurations of the interconnection arrangement 10 that are possible for the same or different configurations of pad-mounted gear 12 and to illustrate the flexibility of the invention to accommodate different configurations, the interconnection arrangement 10 in one specific illustration is arranged to accommodate from one to four locations of switch operators. Where only one switch operator is provided, at the location of assembly 18, only the cable harness 66 is provided and the internal and external ducts 52 and 60 and the covers 44,46 on the right-hand side of the base 24 in FIG. 4 are deleted. Referring now additionally to FIG. 10, a cover plate 90 may be provided that can be affixed over either selected ones of the openings 54 of the structural members 38 or the central opening 37 of the structural support member 36 as desired to form a particular configuration. This illustrates that in the various configurations, the cable pathway 48 is totally closed within the base 24. Thus, where two switch operators are provided, at locations 18,20, the cable harness 70 is omitted, the internal and external ducts are omitted at the location for the operator 22, and the cover plate 90 is installed at the opening 54 of the structural member 38 at the upper right in FIG. 4.

Considering other structural details, it should be noted that the internal ducts 52 are not of identical sizes, as can be seen from FIG. 4. Additionally, for the module 16, the external duct 60 is not the same size as the remaining ducts due to the dimensions of the enclosure of the module 16. For example, if four switch operators are provided at the locations 16,18,20, and 22, the external ducts 60 would all be identical. As will be apparent to those familiar with the underground distribution art, sufficient cable termination length must be available to accommodate the interconnection arrangement 10. For example, the interconnection arrangement could replace an existing base spacer or be added to the height of the pad-mounted gear 12 above the pad, assuming sufficient extra length of cable is available.

Turning now to a discussion of the assembly of the interconnection arrangement 10 in a manufacturing environment, the kit of components can be identical to the field retrofit kit or may be slightly different. For example, for manufacturing assembly, the internal duct 52 may be omitted and the routing of cable harnesses performed by direct entry from the central duct between the structural members 38 and into the external duct 60, which is then positioned to 60' from the position as shown in FIG. 4 (i.e., in a downward direction in FIG. 4).

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. An arrangement for field retrofit installation to an existing electrical equipment enclosure having an exterior surface defined by at least one upstanding sidewalls extending from a base perimeter and defining an enclosure interior, the arrangement providing interconnections between different predetermined locations on the exterior surface of the electrical equipment enclosure, the arrangement comprising:

means for supporting the electrical equipment enclosure such that the base perimeter of the electrical equipment enclosure is positioned atop central portion of said supporting means, said supporting means having an exterior surface defined by at least one upstanding sidewalls so as to define an interior space and supporting means base perimeter that defines central portions of said supporting means; and means for defining predetermined enclosed cable pathway ducts within and through said interior space of said supporting means said cable pathway ducts traversing under the central portions of said supporting means, and to and through said at last one upstanding sidewalls of said exterior surface of said supporting means, extending upward and being attached to predetermined points on the exterior surface of at least one of said upstanding sidewalls of the electrical equipment enclosure, said enclosed cable pathway ducts defining enclosed cable pathways between the predetermined points on the exterior surface of the electrical equipment enclosure so as to provide total isolation between said enclosed cable pathways and said interior space of said supporting means as well as the enclosure interior.

2. The arrangement of claim 1 further comprising at least one cable harnesses disposed through said enclosed cable pathways ducts to provide predetermined interconnection paths between the predetermined points on the exterior surface of the electrical equipment enclosure.

3. A kit of component pans for assembling with either an existing, installed electrical equipment enclosure having upstanding sidewalls defining an interior and an exterior surface or during the manufacture of the electrical equipment enclosure to provide interconnections between predetermined points on the exterior surface of the electrical equipment enclosure, the kit comprising:

a base assembly for supporting the electrical equipment enclosure atop central portions of the base assembly, said base assembly having peripheral upstanding sidewalls defining a predetermined exterior surface, an interior and surrounding said central portions therebetween, and means for defining; a predetermined number of different configurations of enclosed pathway ducts, said cable pathway ducts traversing under said central portions and through said peripheral upstanding sidewalls of said base assembly, said cable pathway ducts extending upward therefrom and being attached to said predetermined points on the exterior surface of at least one of said upstanding sidewalls thereby communicating between predetermined combinations of predetermined points on said exterior surface of said base assembly and to said predetermined points on the exterior of the electrical equipment enclosure, said defining means comprising a plurality of component parts being assembled in different configurations to achieve said enclosed pathway ducts so as to define completely enclosed pathways between said predetermined points on the exterior surface of the electrical equipment enclosure that are totally isolated from the interior of the electrical equipment enclosure and said interior of said base assembly.

4. A first kit of component parts for assembly during manufacture or field retrofit to provide a plurality of different pad-mounted gear assemblies, said first kit comprising:

pad-mounted gear having an equipment enclosure with an interior and an exterior surface and housing one of a plurality of different configurations of components;

at least one switch operators for affixing to said exterior surface of said equipment enclosure;

an auxiliary enclosure for housing control components and that is adapted for affixing to said exterior surface of said equipment enclosure; and first means having a predetermined exterior surface for supporting said equipment enclosure atop said first means and for defining a plurality of different predetermined configurations of enclosed cable pathway ducts within said first means and extending to predetermined points on said exterior surface of said first means, said predetermined points corresponding to locations of said at least one switch operators and said auxiliary enclosure, said first means comprising a second kit of component parts for assembling with each other and to said first means to provide said plurality of different predetermined configurations of enclosed cable pathway ducts corresponding to said plurality of different pad-mounted gear assemblies which are defined by a desired combination and configuration of one of said plurality of different configurations of components, said one or more switch operators, said auxiliary enclosure, and one of said plurality of different predetermined configurations of enclosed cable pathway ducts, whereby total isolation is provided between said interior of said equipment enclosure and said one of said plurality of different predetermined configurations of enclosed cable pathway ducts.

5. The first kit of claim 4 wherein said first means further comprises a plurality of different cable harnesses for routing within said plurality of different predetermined configurations of enclosed cable pathway ducts, one or more of said plurality of different cable harnesses being provided for each of said plurality of different pad-mounted gear assemblies.

6. The first kit of claim 4 wherein said second kit of component parts of said first means comprises first, second, and third structural members that are arranged to interfit with each other and said first means to provide said plurality of different predetermined configurations of enclosed cable pathway ducts, with different numbers of each of said first, second, and third structural members being utilized to provide each of said plurality of different predetermined configurations of enclosed cable pathways ducts.

7. The kit of claim 4 wherein said first means comprises a support base and said kit of component parts of said first means comprises external duct defining means affixed between said support base and each of said switch operators and auxiliary enclosures, said external duct defining means being located at said predetermined points.

8. The first kit of claim 7 further comprising cable harness means being routed through said one of said plurality of different predetermined configurations of enclosed cable pathways ducts, through said external duct defining means, and into said switch operators and said auxiliary enclosure for providing the desired interconnections between said one or more switch operators and said control components.

9. An arrangement that defines predetermined enclosed cable pathways for either factory assembly in the manufacture of pad-mounted gear or for field retrofit of pad-mounted gear, the pad-mounted gear including an enclosure having an enclosure interior and a predetermined enclosure base perimeter, the arrangement comprising:

a base having/one or more upstanding sidewalls defining a base interior and a base perimeter of the same shape as the predetermined enclosure base perimeter for supporting the pad-mounted gear, said base perimeter of said base further defining central portions of said base; and means for defining enclosed cable pathway ducts between predetermined points on said base perimeter of said base, thereby defining totally enclosed cable pathway ducts traversing under said central portions and through said at least one sidewalls of said base assembly, said cable pathway ducts extending upward therefrom and being attached to said predetermined points on the exterior surface of at least one of said upstanding sidewalls, thereby extending between said predetermined points on said base perimeter of said base so as to be completely isolated both from said base interior and the interior of the enclosure, said base further including openings being provided through said one or more upstanding sidewalls at each of said predetermined points, said arrangement further comprising external duct defining means extending from said predetermined points on said base perimeter of said base and extending said totally enclosed cable pathways above said base.

10. The arrangement of claim 9 further comprising electrical interconnection means being disposed through enclosed cable pathways ducts for providing predetermined electrical interconnection paths between said predetermined points.

* * * * *